United States Patent
Huang et al.

(10) Patent No.: US 12,244,024 B2
(45) Date of Patent: Mar. 4, 2025

(54) TOP COVER ASSEMBLY AND SECONDARY BATTERY

(71) Applicant: CONTEMPORARY AMPEREX TECHNOLOGY (HONG KONG) LIMITED, Hong Kong (CN)

(72) Inventors: Shoujun Huang, Ningde (CN); Yuanbao Chen, Ningde (CN); Huasheng Su, Ningde (CN); Peng Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 681 days.

(21) Appl. No.: 17/128,054

(22) Filed: Dec. 19, 2020

(65) Prior Publication Data

US 2021/0135310 A1 May 6, 2021

Related U.S. Application Data (63) Continuation of application No. PCT/CN2020/082356, filed on Mar. 31, 2020.

(30) Foreign Application Priority Data

May 27, 2019 (CN) .......................... 201920776865.5

(51) Int. Cl.
    *H01M 50/148* (2021.01)
    *H01M 10/0525* (2010.01)
    (Continued)

(52) U.S. Cl.
    CPC ..... *H01M 50/148* (2021.01); *H01M 10/0525* (2013.01); *H01M 50/172* (2021.01);
    (Continued)

(58) Field of Classification Search
    CPC ............. H01M 50/172; H01M 50/184; H01M 50/188; H01M 50/148; H01M 50/15;
    (Continued)

(56) References Cited

U.S. PATENT DOCUMENTS 10,170,734 B2   1/2019   Li et al.
2003/0194609 A1*  10/2003  Nam .................. H01M 50/147
                                                              429/174

(Continued)

FOREIGN PATENT DOCUMENTS

CN       204809275 U    11/2015
CN       205159378 U    4/2016
(Continued)

OTHER PUBLICATIONS

The extended European search report for EP Application No. 20813909.7, dated Sep. 6, 2021, 9 pages.
(Continued)

*Primary Examiner* — Stewart A Fraser
*Assistant Examiner* — Lilia Nedialkova
(74) *Attorney, Agent, or Firm* — East IP P.C.

(57) ABSTRACT

The present application relates to a top cover assembly and a secondary battery. The top cover assembly includes: a top cover plate including a lead-out hole and an inside surface forming the lead-out hole; an electrode terminal including a cylindrical portion penetrating the lead-out hole and an annular flange, the annular flange extending beyond the inside surface along the lead-out hole; a sealing ring including a barrel portion and a ring portion, surrounding the cylindrical portion by the barrel portion. The ring portion includes a first ring body and a second ring body distributed in the radial direction; an insulating member including a connecting portion and an extension portion, and the connecting portion seals the second ring body; a portion of the
(Continued)

insulating member beyond the second ring body forms the extension portion, and in the radial direction, the extension portion extends beyond the annular flange.

7 Claims, 5 Drawing Sheets

(51) Int. Cl.
    *H01M 50/172*     (2021.01)
    *H01M 50/184*     (2021.01)
    *H01M 50/188*     (2021.01)
    *H01M 50/552*     (2021.01)

(52) U.S. Cl.
    CPC ....... *H01M 50/184* (2021.01); *H01M 50/188* (2021.01); *H01M 50/552* (2021.01); *H01M 2220/20* (2013.01)

(58) Field of Classification Search
    CPC ............. H01M 50/176; H01M 50/552; H01M 50/553; H01M 10/0525; H01M 2220/20
    See application file for complete search history.

(56) References Cited

U.S. PATENT DOCUMENTS

| | | | |
|---|---|---|---|
| 2011/0183194 A1* | 7/2011 | Lee | H01M 50/567 429/179 |
| 2011/0200870 A1* | 8/2011 | Kim | H01M 50/567 429/179 |
| 2011/0294001 A1* | 12/2011 | Byun | H01M 50/184 429/181 |
| 2014/0234669 A1* | 8/2014 | Byun | H01M 50/534 429/7 |
| 2016/0099445 A1 | 4/2016 | Park et al. | |

FOREIGN PATENT DOCUMENTS

| | | |
|---|---|---|
| CN | 205429020 U | 8/2016 |
| CN | 205508892 U | 8/2016 |
| CN | 205564833 U | 9/2016 |
| CN | 106450062 A | 2/2017 |
| CN | 207690844 U | 8/2018 |
| CN | 209747563 U | 12/2019 |
| EP | 2355210 A1 | 8/2011 |
| EP | 2579357 A1 | 4/2013 |
| EP | 2860786 A1 | 4/2015 |
| JP | 2009087729 A | 4/2009 |
| WO | WO2018126438 A1 | 7/2018 |

OTHER PUBLICATIONS

The First Office Action for Indian Application No. 202127057118, dated Jun. 16, 2022, 7 pages.
International Search Report for PCT/CN2020/082356, Jul. 6, 2020, 12 pages.

* cited by examiner

TOP COVER ASSEMBLY AND SECONDARY BATTERY

CROSS-REFERENCE OF RELATED APPLICATIONS

This application is a continuation of International Application No. PCT/CN2020/082356, filed on Mar. 31, 2020, which claims priority from Chinese patent application No. 201920776865.5, entitled "Top Cover Assembly and Secondary Battery", filed on May 27, 2019, both of which are incorporated herein by reference in their entireties.

TECHNICAL FIELD

The present application relates to the field of battery technology, in particular to a top cover assembly and a secondary battery.

BACKGROUND

Lithium ion secondary batteries have been widely used in hybrid vehicles and electric vehicles. This is due to its advantages such as high energy, high capacity and high power. The secondary battery includes a top cover plate, an electrode terminal disposed on one side of the top cover plate, a lower insulating member connected to the top cover plate, and a current collector connected to the electrode terminal. However, the secondary battery of the prior art may have safety problems during use.

SUMMARY

The present application provides a top cover assembly and a secondary battery. The top cover assembly is provided with an insulating member to improve the safety in use between the top cover plate and the electrode terminal, thereby ensuring the safety in use of the secondary battery.

In an aspect, the present application provides a top cover assembly, which includes:

a top cover plate including a lead-out hole and an inside surface forming the lead-out hole; an electrode terminal including a cylindrical portion and an annular flange extending in a circumferential direction of the cylindrical portion, the cylindrical portion penetrates through the lead-out hole, and the annular flange extends beyond the inside surface along the radial direction of the lead-out hole; a sealing ring including a barrel portion and a ring portion extending along the circumference of the barrel portion, the barrel portion of the sealing ring surrounds the cylindrical portion, and the inside surface is connected with the cylindrical portion through the barrel portion in a sealing manner, the ring portion includes a first ring body and a second ring body distributed successively in the radial direction, the first ring body is connected with the barrel portion; the annular flange is connected with the top cover plate through the first ring body in a sealing manner, and the second ring body does not extend beyond the annular flange; an insulating member including a connecting portion and an extension portion, along the axial direction of the lead-out hole, a projection of the connecting portion overlaps a projection of the second ring body, and the connecting portion is sealed and connected with the second ring body; a portion of the insulating member extending beyond the second ring body forms the extension portion, and in the radial direction, the extension portion extends beyond the annular flange.

According to embodiments of the aspect of the present application, the connecting portion is disposed between the second ring body and the annular flange.

According to embodiments of the aspect of the present application, the connecting portion is disposed between the second ring body and the top cover plate.

According to embodiments of the aspect of the present application, the connecting portion and the extension portion are both a sheet-like structure.

According to embodiments of the aspect of the present application, the insulating member further includes a cylinder body connected to the extension portion, the cylinder body extends in the axial direction, the cylinder body is disposed around the annular flange, and along the axial direction, the outer peripheral surface of the annular flange is at least partially covered by the cylinder body.

According to embodiments of the aspect of the present application, along the axial direction, the thickness of the connecting portion is D1, and the maximum thickness of the first ring body is D2, wherein the value of D1/D2 is 0.05 to 0.73.

According to embodiments of the aspect of the present application, along the axial direction, the thickness of the connecting portion is D1, and the thickness of the connecting portion D1 ranges from 0.1 mm to 0.7 mm.

According to embodiments of the aspect of the present application, the sealing ring includes an annular accommodation groove, the annular accommodation groove and the second ring body are arranged in an axial direction, and the connecting portion is at least partially disposed in the annular accommodation groove.

According to embodiments of the aspect of the present application, the top cover assembly further includes a lower insulating plate, and a projection of the lower insulating plate and a projection of the extension portion include an overlapped area in the axial direction.

According to embodiments of the aspect of the present application, the lower insulating plate contacts and seals the second ring body to form a sealing interface.

According to embodiments of the aspect of the present application, the projection of the second ring body and the projection of the lower insulating plate overlap in the axial direction, and the second ring body and the lower insulating plate form a sealing interface at the overlap.

The top cover assembly according to the present application includes a top cover plate, an electrode terminal connected to the top cover plate, a sealing ring and an insulating member. The electrode terminal includes a cylindrical portion and an annular flange. The sealing ring includes a barrel portion and a ring portion. The ring portion includes a first ring body and a second ring body. The cylindrical portion of the electrode terminal penetrates through the lead-out hole provided on the top cover plate, and the cylindrical portion is connected with the inside surface forming the lead-out hole on the top cover plate through the barrel portion of the sealing ring in a sealing manner. The annular flange is connected with the top cover plate through the first ring body in a sealing manner. The insulating member includes a connecting portion and an extension portion. The connecting portion is connected with the second ring body in a sealing manner. Along the radial direction of the lead-out hole, the extension portion extends beyond the annular flange so that the extension portion can lengthen a creepage distance between the top cover plate and the annular flange of the electrode terminal, and thus when the top cover plate and the electrode terminal of the top cover assembly are subjected to high voltage, the possibility of breakdown between the top cover plate and the electrode terminal is reduced, enhancing the safety in use of the secondary battery of the top cover assembly of embodiments of the present application.

In another aspect, an embodiment of the present application provides a secondary battery, which includes:
  a housing including an opening; an electrode assembly accommodated in the housing; the above-mentioned top cover assembly, the top cover assembly seals the opening; the electrode assembly is electrically connected with the electrode terminal.

BRIEF DESCRIPTION OF THE DRAWINGS

The features, advantages, and technical effects of exemplary embodiments of the present application will be described below with reference to the accompanying drawings.

In the drawings, the drawings are not drawn according to actual scale.

DESCRIPTION OF REFERENCE SIGNS 10. secondary battery;
11. housing;
12. electrode assembly;
13. top cover plate; 131. lead-out hole; 132. inside surface;
14. electrode terminal; 141. cylindrical portion; 142. annular flange;
15. sealing ring; 151. barrel portion; 152. ring portion; 152a. first ring body; 152b. second ring body; 152c. annular accommodation groove;
16. insulating member; 161. connecting portion; 162. extension portion; 163. cylinder body;
17. current collector
18. lower insulating plate;
99. sealing interface;
X. radial direction; Y. axial direction.

DETAILED DESCRIPTION

The implementation of the present application will be described in further detail below in conjunction with the drawings and embodiments. The detailed description and drawings of the following embodiments are used to exemplarily illustrate the principles of the present application, but cannot be used to limit the scope of the present application, that is, the present application is not limited to the described embodiments.

In the description of the present application, it should be noted that, unless otherwise specified, "plurality" means two or more; the terms "upper", "lower", "left", "right", "inner", and "outside" indicating the orientation or positional relationship is only for the convenience of describing the present application and simplifying the description, rather than indicating or implying that the device or element referred to must include a specific orientation, be constructed and operated in a specific orientation, and therefore cannot be understood as restriction to the present application. In addition, the terms "first", "second", etc. are only used for descriptive purposes, and cannot be understood as indicating or implying relative importance.

In the description of the present application, it should also be explained that, unless otherwise clearly specified and limited, the terms "installation", "connected with", "connection" or the like should be understood in a broad sense, and for example, it can be a fixed connection or a detachable connection, or integral connection; it can be a direct connection or indirect connection through intermediation. For the skilled person in the art, the specific meaning of the above-mentioned terms in the present application can be understood according to the specific circumstances.

After the inventors noticed that the existing secondary battery may have safety problems during use, the inventors conducted research and analysis on the various structures of the secondary battery. The inventors found that during the use of the secondary battery, a short circuit occurs between the top cover plate and the electrode terminals, which leads to safety problems in the secondary battery. After further research and analysis, the inventors found that the creepage distance between the top cover plate and the electrode terminal is too short so that when the top cover plate and the electrode terminal are subjected to high voltage, the top cover plate and the electrode terminal will break down and short-circuit.

Based on the above-mentioned problems found by the inventors, the inventors improved the structure of the secondary battery, and embodiments of the present application will be further described below.

For better understanding of the present application, some embodiments of the present application are described below with reference to FIGS. 1 to 5.

Figure 1:
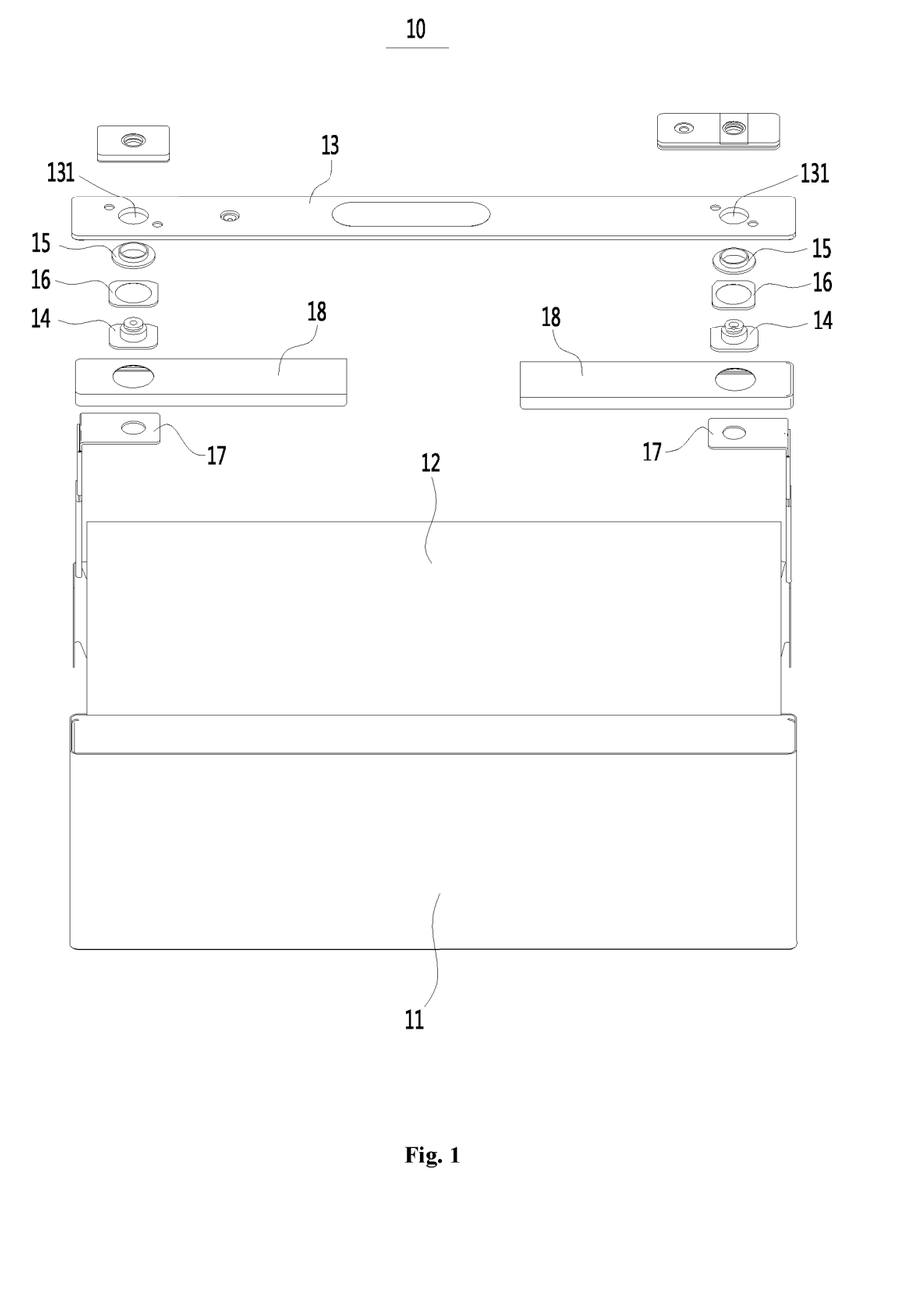
FIG. 1 is a schematic diagram of an exploded structure of a secondary battery according to an embodiment of the present application.
Figure 2:
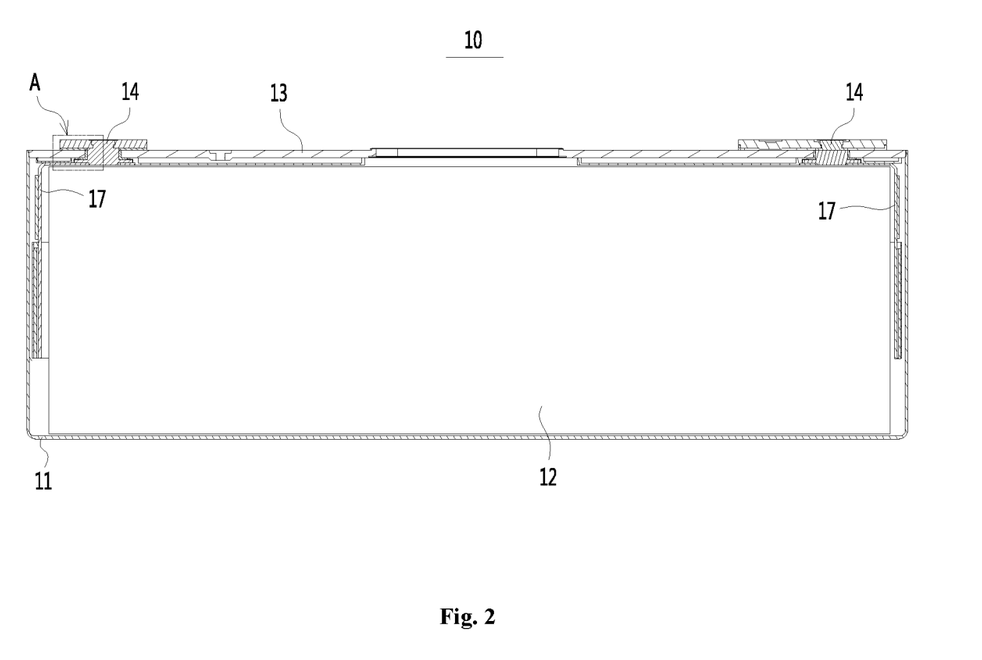
FIG. 2 is a schematic diagram of the cross-sectional structure a secondary battery according to an embodiment of the present application.

As shown in FIG. 1 and FIG. 2, the secondary battery 10 of embodiments of the present application includes a housing 11, an electrode assembly 12 disposed in the housing 11, and a top cover assembly connected with the housing 11 in a sealing manner.

The housing 11 in embodiments of the present application includes a hexahedral square structure or other shapes. The housing 11 includes an internal space that contains the electrode assembly 12 and the electrolyte. The housing 11 may be made of materials such as aluminum, aluminum alloy, or plastic.

The electrode assembly 12 of embodiments of the present application may form a body by stacking or winding a first electrode plate, a second electrode plate, and a separator between the first electrode plate and the second electrode plate together, wherein the separator is an insulator between the first electrode plate and the second electrode plate. The electrode assembly 12 of the embodiment is a flat structure as a whole, which includes a predetermined thickness, height, and width. In the embodiment, illustrative explanation is made by taking the first electrode plate as a positive electrode plate and the second electrode plate as a negative electrode plate. Similarly, in other embodiments, the first electrode plate may be a negative electrode plate, and the second electrode plate is a positive electrode plate. In addition, the active material of the positive electrode plate is coated on the coated area of the positive electrode plate, and the active material of the negative electrode plate is coated on the coated area of the negative electrode plate. The uncoated area extending from the coated area of the main body is used as a tab. The electrode assembly 12 includes two tabs, namely a positive tab and a negative tab. The positive tab extends from the coated area of the positive electrode plate, and the negative tab extends from the coated area of the negative tab.

The top cover assembly of embodiments of the present application includes a top cover plate 13, an electrode terminal 14, a sealing ring 15 and an insulating member 16. The top cover plate 13 is used for sealing connection with the housing 11 to enclose the electrode assembly 12 in the housing 11. The top cover plate 13 includes a lead-out hole 131 and an inside surface 132 forming the lead-out hole 131.

Figure 3:
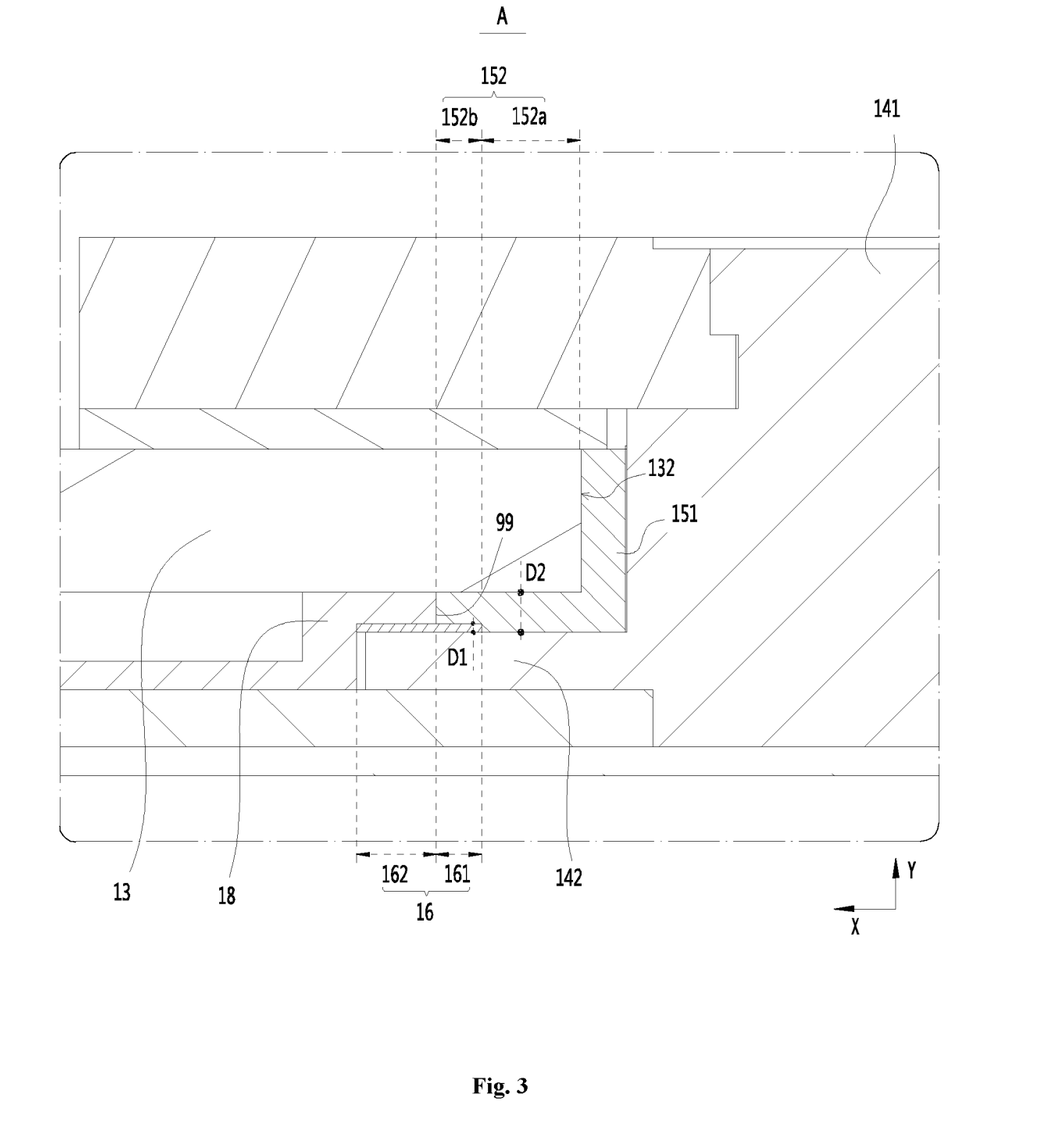
FIG. 3 is an enlarged view of A in FIG. 2.

Referring to FIG. 3, the electrode terminal 14 includes a cylindrical portion 141 and an annular flange 142 extending in the circumferential direction of the cylindrical portion 141. The cylindrical portion 141 penetrates through the lead-out hole 131. The portion of the cylindrical portion 141 extending out of the lead-out hole 131 is connected to an external adapting plate. The external adapting plate is used to be connected with the busbar. The annular flange 142 extends beyond the inside surface 132 along the radial direction X of the lead-out hole 131. The annular flange 142 is provided on one side of the top cover plate 13. The cylindrical portion 141 and the annular flange 142 jointly cover the lead-out hole 131. The outer peripheral contour of the annular flange 142 may take a shape like a round shape or a square shape. The center hole of the sealing ring 15 is disposed corresponding to the lead-out hole 131.

The sealing ring 15 includes a barrel portion 151 and a ring portion 152 extending in the circumferential direction of the barrel portion 151. The outer peripheral contour of the ring portion 152 may have a shape like a round shape or a square shape. The barrel portion 151 of the sealing ring 15 surrounds the cylindrical portion 141. The inside surface 132 of the top cover plate 13 is connected with the cylindrical portion 141 through the barrel portion 151 in a sealing manner. The ring portion 152 includes a first ring body 152a and a second ring body 152b successively distributed along the radial direction X of the lead-out hole 131. Along the radial direction X of the lead-out hole 131, the second ring body 152b is disposed on the outer periphery of the first ring body 152a. The ring portion 152 is connected with the barrel portion 151 through the first ring body 152a. The annular flange 142 is connected with the top cover plate 13 through the first ring body 152a in a sealing manner. The annular flange 142, the top cover plate 13, and the first ring body 152a are in a sealed state among them. Along the radial direction X of the lead-out hole 131, the second ring body 152b does not extend beyond the annular flange 142. Preferably, along the radial direction X of the lead-out hole 131, an edge of the annular flange 142 extends beyond an edge of the second ring body 152b. Optionally, the sealing ring 15 is an elastomer. The material of the sealing ring 15 may be rubber or silicone.

The insulating member 16 includes a connecting portion 161 and an extension portion 162 successively distributed along the radial direction X of the lead-out hole 131. The extension portion 162 is positioned on the outer periphery of the connecting portion 161. The connecting portion 161 and the second ring body 152b are arranged along the axis Y of the lead-out hole 131. Along the axial direction Y of the lead-out hole 131, a projection of the connecting portion 161 overlaps with a projection of the second ring body 152b. The connecting portion 161 is connected with the second ring body 152b in a sealing manner. The portion of the insulating member 16 extending beyond the second ring body 152b forms the extension portion 162. Along the radial direction X of the lead-out hole 131, the extension portion 162 extends beyond the annular flange 142. An edge of the extension portion 162 away from the connecting portion 161 extends beyond an edge of the annular flange 142. Optionally, the insulating member 16 can be made of insulating and electrolyte resistant materials such as PC, PFA, PVC, PP, PE, or PET. The extension portion 162 of the insulating member 16 can lengthen a creepage distance between the top cover plate 13 and the annular flange 142, and can increase the electrical gap between the top cover plate 13 and the annular flange 142.

The top cover assembly of embodiments of the present application includes a top cover plate 13, an electrode terminal 14 connected to the top cover plate 13, a sealing ring 15 and an insulating member 16. The electrode terminal 14 includes a cylindrical portion 141 and an annular flange 142. The sealing ring 15 includes a barrel portion 151 and a ring portion 152. The ring portion 152 includes a first ring body 152a and a second ring body 152b. The cylindrical portion 141 of the electrode terminal 14 penetrates through the lead-out hole 131 provided on the top cover plate 13, and the cylindrical portion 141 is connected with the inside surface 132 of the lead-out hole 131 formed on the top cover plate 13 through the barrel portion 151 of the sealing ring 15 in a sealing manner. The annular flange 142 is connected with the top cover plate 13 through the first ring body 152a in a sealing manner. The insulating member 16 includes a connecting portion 161 and an extension portion 162. The connecting portion 161 is connected with the second ring body 152b in a sealing manner. Along the radial direction X of the lead-out hole 131, the extension portion 162 extends beyond the annular flange 142 so that the extension portion 162 can lengthen the creepage distance between the top cover plate 13 and the annular flange 142 of the electrode terminal 14, and at the same time can increase the electrical gap between the top cover plate 13 and the annular flange 142, thus reducing the possibility of breakdown between the top cover plate 13 and the electrode terminal 14 when the top cover plate 13 and the electrode terminal 14 of the top cover assembly are subjected to high voltage, and improving the safety in use of applying the secondary battery 10 of the top cover assembly of embodiments of the present application.

In an embodiment, referring to FIG. 3, the connecting portion 161 is disposed between the second ring body 152b and the annular flange 142. The connecting portion 161 is in contact with an upper surface of the annular flange 142 facing the second ring body 152b. Optionally, the connecting portion 161 is connected with the upper surface of the annular flange 142 in a sealing manner. The upper surface of the annular flange 142 is a flat surface. Optionally, the connecting portion 161 is adhesively connected with the annular flange 142. In another embodiment, referring to FIG. 4, the connecting portion 161 is disposed between the second ring body 152b and the top cover plate 13. The connecting portion 161 is in contact with a lower surface of the top cover plate 13 facing the second ring body 152b. Optionally, the connecting portion 161 is connected to the top cover plate 13 in a sealing manner. The lower surface of the top cover plate 13 is a flat surface. Optionally, the connecting portion 161 is adhesively connected with the second ring body 152b.

In an embodiment, as shown in FIG. 3, the connecting portion 161 and the extension portion 162 of the insulating member 16 are both a sheet-like structure, thereby reducing the space occupied in the axial direction Y of the lead-out hole 131, which is beneficial to improving the structure compactness of the top cover assembly and is further beneficial to increasing the energy density of the secondary battery 10. The connecting portion 161 and the extension portion 162 of the insulating member 16 are both ring-shaped. Along the radial direction X of the lead-out hole 131, the extension portion 162 is positioned on the outer periphery of the connecting portion 161. In an exemplary embodiment, the connecting portion 161 and the extension portion 162 of the insulating member 16 are an integral structure. Along the axial direction Y of the lead-out hole 131, the thickness of the connecting portion 161 is the same as that of the extension portion 162.

Figure 5:
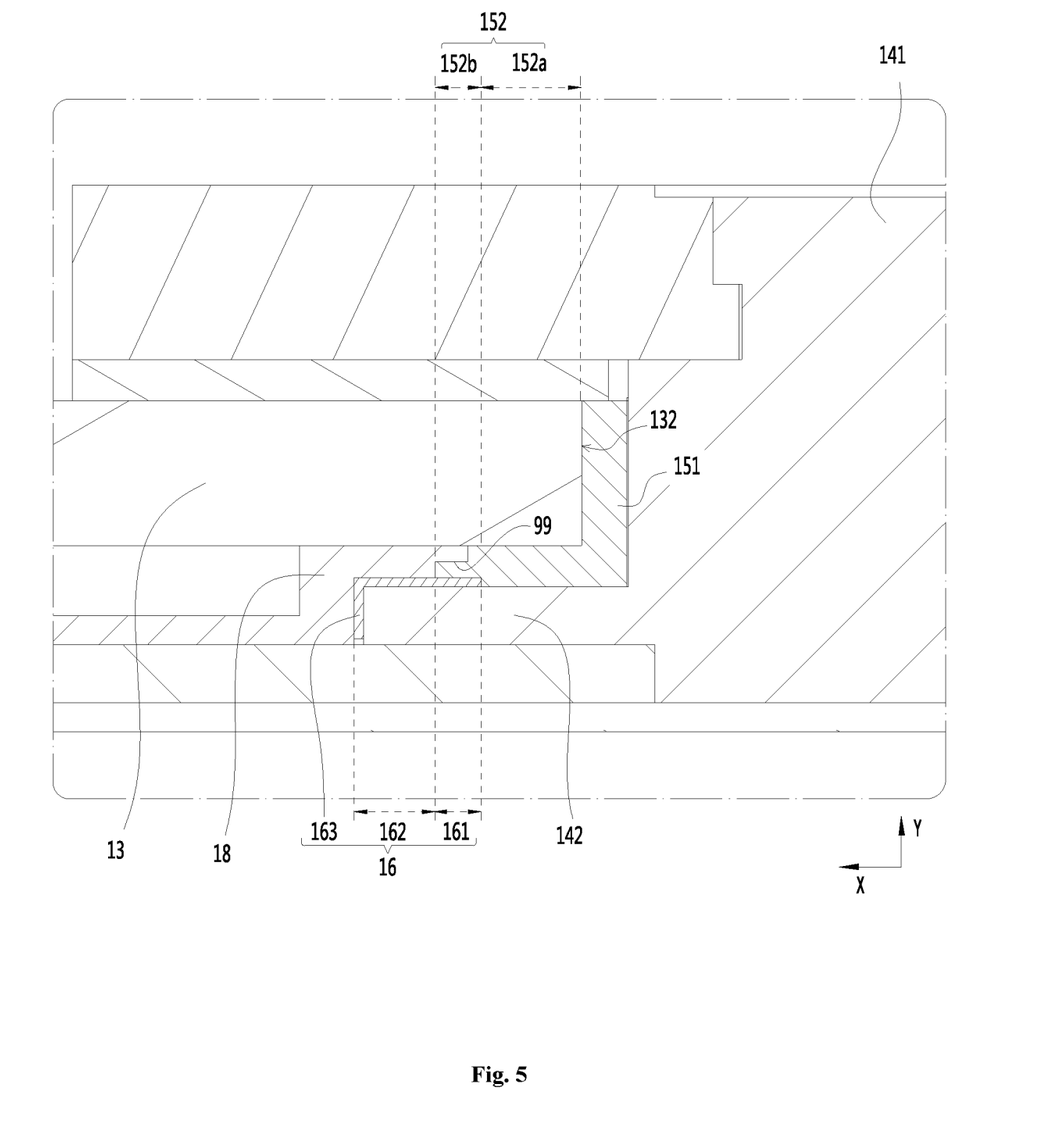
FIG. 5 is a schematic diagram of a connection structure between an insulating member and a sealing ring according to another embodiment of the present application.

In an embodiment, referring to FIG. 5, the insulating member 16 further includes a cylinder body 163 connected to the extension portion 162. The cylinder body 163 extends along the axial direction Y of the lead-out hole 131. The cylinder body 163, the extension portion 162, and the connecting portion 161 form an accommodation space. The cylinder body 163 is disposed around the annular flange 142. Along the axial direction Y of the lead-out hole 131, the outer peripheral surface of the annular flange 142 is at least partially covered by the cylinder body 163 so that the annular flange 142 is at least partially contained in the accommodation space. The cylinder body 163 and the extension portion 162 are used together to further lengthen the creepage distance from the top cover plate 13 to the annular flange 142. Optionally, the cylinder body 163 includes a thin-walled structure. The cylinder body 163, the extension portion 162 and the connecting portion 161 are an integral structure. In an exemplary embodiment, the outer peripheral surface of the annular flange 142 is partially covered by the cylinder body 163 so that the cylinder body 163 is disposed to misalign with the lower surface of the annular flange 142 away from the sealing ring 15 along the axial Y of the lead-out hole 131 away from the end surface of the extension portion 162 and along the axial direction Y of the lead-out hole 131, the annular flange 142 extends beyond the end surface of the cylinder body 163. In an exemplary embodiment, the outer peripheral surface of the annular flange 142 is completely covered by the cylinder body 163 so that the cylinder body 163 is disposed to misalign with the lower surface of the annular flange 142 away from the sealing ring 15 along the axial Y of the lead-out hole 131 away from the end surface of the extension portion 162 or along the axial direction Y of the lead-out hole 131, the end surface of the cylinder body 163 extends beyond the lower surface of the annular flange 142.

In an embodiment, referring to FIG. 3, along the axial direction Y of the lead-out hole 131, the thickness of the connecting portion 161 is D1, and the maximum thickness of the first ring body 152a is D2, where the value of D1/D2 is 0.05 to 0.73. When the value of D1/D2 is less than 0.05, the thickness of the insulating member 16 is smaller than the thickness of the first ring body 152a so that the rigidity of the insulating member 16 itself is small, and when the insulating member 16 is subjected to an external force, structural damage is likely to occur, resulting in insulation failure. Meanwhile, the thickness of the insulating member 16 is small, the insulation of the insulating member 16 itself is poor, causing that when a high voltage is applied between the top cover plate 13 and the annular flange 142 of the electrode terminal 14, the insulating member 16 itself has a risk of breakdown. In addition, the thickness of the insulating member 16 itself is too small, which increases the processing and manufacturing difficulty and the processing cost of the insulating member 16. When the value of D1/D2 is greater than 0.73, the thickness of the insulating member 16 is large so that the thickness of the second ring body 152b is smaller than that of the first ring body 152a, and thus the rigidity of the second ring body 152b itself is small, causing that when the second ring body 152b is subjected to an external force, structural damage is likely to occur, resulting in seal failure. At the same time, the thickness of the insulating member 16 is relatively large, which reduces the structural compactness of the top cover assembly, thereby reducing the energy density of the secondary battery 10 to which the top cover assembly is applied. In addition, the thickness of the second ring body 152b itself is relatively too small, which increases the processing and manufacturing difficulty and the processing cost of the sealing ring 15. Optionally, the thickness D1 of the connecting portion 161 of the insulating member 16 ranges from 0.1 mm to 0.7 mm.

Figure 4:
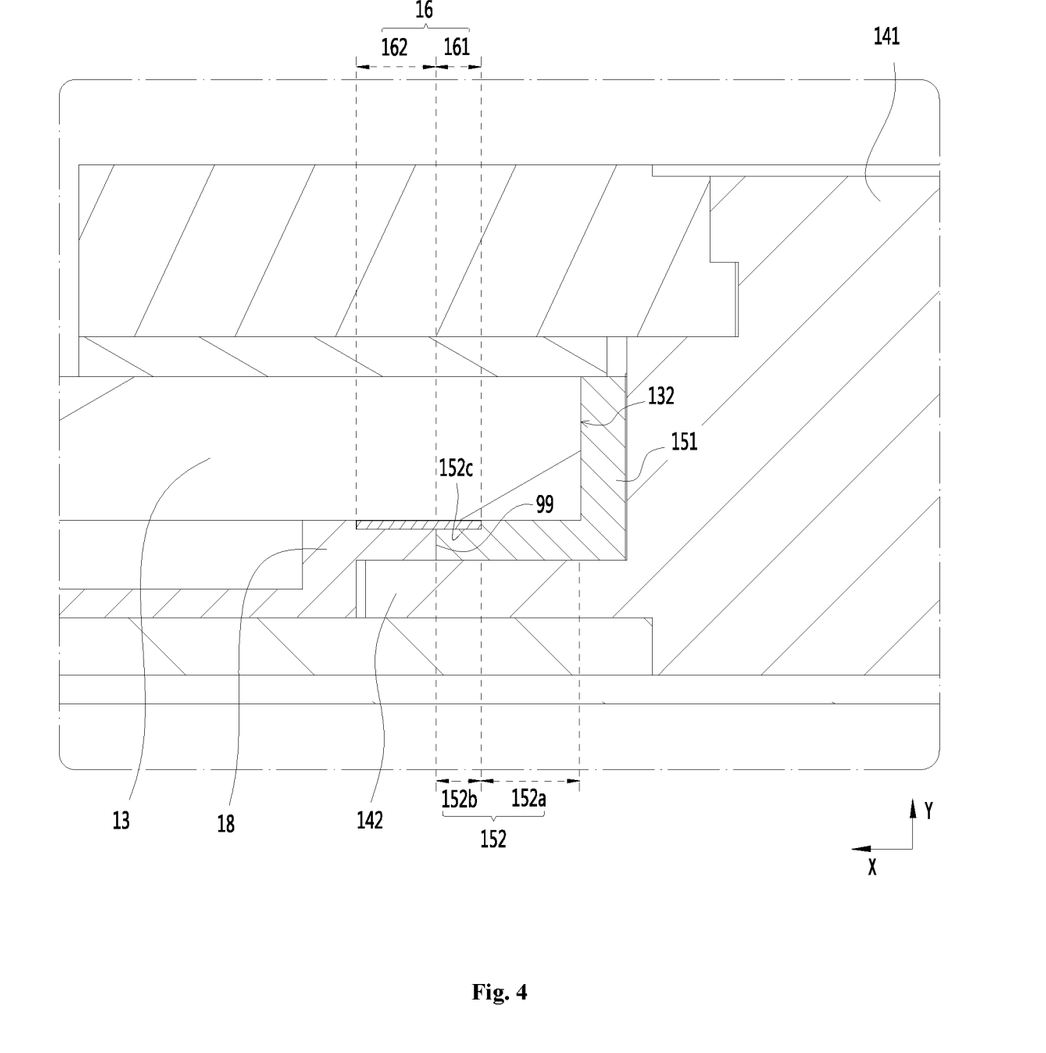
FIG. 4 is a schematic diagram of a connection structure of an insulating member and a sealing ring according to an embodiment of the present application.

In an embodiment, referring to FIG. 4, the sealing ring 15 includes an annular accommodating groove 152c. The annular accommodating groove 152c and the second ring body 152b are arranged along the axis Y of the lead-out hole 131, that is, the position of the annular accommodating groove 152c corresponds to the position of the second ring body 152b along the axial Y of the lead-out hole 131. A step is formed between the first ring body 152a and the second ring body 152b. The connecting portion 161 is at least partially disposed in the annular accommodating groove 152c and matches the annular accommodating groove 152c in shape. During the assembling process, the connecting portion 161 of the insulating member 16 can be disposed in the annular accommodating groove 152c in advance so that the sealing ring 15 functions to positionally limit the entire insulating member 16 and reduces the possibility of the positional movement of the insulating member 16 during the assembling process, which facilitates to reduce assembling difficulty and improve assembling convenience and assembling efficiency. Optionally, the connecting portion 161 is entirely accommodated in the annular accommodating groove 152c. The connecting portion 161 matches the annular receiving groove 152c in shape.

In an embodiment, the top cover assembly further includes a lower insulating plate 18. The lower insulating plate 18 is disposed on one side of the top cover plate 13 and connected to the top cover plate 13. The lower insulating plate 18 and the extension portion 162 overlap each other. A projection of the lower insulating plate 18 and a projection of the extension portion 162 include an overlapped area along the axial direction Y of the lead-out hole 131. The lower insulating plate 18 includes an overlap portion, and is overlapped with the extension portion 162 at the overlap portion. The lower insulating plate 18 can function to restrict and positionally limit the extension portion 162 in the axial direction Y of the lead-out hole 131, thereby reducing the possibility of the extension portion 162 moving along the axial direction Y of the lead-out hole 131. In addition, after the lower insulating plate 18 and the extension portion 162 overlap in the axial direction Y, the electrical gap between the top cover plate 13 and the annular flange 142 can be blocked, further reducing the possibility of the breakdown between the top cover plate 13 and the annular flange 142. In an exemplary embodiment, a gap is formed between the lower insulating plate 18 and the second ring body 152b. The insulating member 16 covers the gap. In an exemplary embodiment, referring to FIGS. 3 to 5, the lower insulating plate 18 contacts and seals the second ring body 152b to form a sealing interface 99 so that the electrolyte entering the gap between the lower insulating plate 18 and the second ring body 152b can be reduced, thereby reducing the risk of breakdown between the top cover plate 13 and the annular flange 142 when the secondary battery is subjected to high voltage, and improving the safety of the top cover assembly during use. The insulating member 16 covers the sealing interface 99. In an exemplary embodiment, as shown in FIG. 3 or FIG. 4, the surface of the lower insulating plate 18 and the surface of the second ring body 152b opposite to each other form a sealing interface 99. The sealing interface 99 is perpendicular to the radial direction X, and its cross section is in the shape of "|". In an exemplary embodiment, the projection of the second ring body 152b and the projection of the lower insulating plate 18 overlap along the axial direction Y, and the second ring body 152b and the lower insulating plate 18 form a sealing interface 99 at the overlap. The second ring body 152b and the lower insulating plate 18 overlap each other and form an overlap where they overlap. Optionally, referring to FIG. 5, the sealing interface 99 is perpendicular to the axial direction Y, and its cross section is in the shape of "-". Alternatively, the sealing interface 99 is "Z" shaped.

In embodiments of the present application, in embodiments where the insulating member 16 and the lower insulating plate 18 are not provided, the electrical gap between the top cover plate 13 and the annular flange 142 is a vertical distance along the axial direction Y. In embodiments where the insulating member 16 is provided, the electrical gap between the top cover plate 13 and the annular flange 142 needs to be measured across the edge of the extension portion 162, thus increasing the electrical gap between the top cover plate 13 and the annular flange 142. In embodiments where the insulating member 16 and the lower insulating plate 18 are provided, the extension portion 162 of the insulating member 16 and the lower insulating plate 18 overlap in the axial direction Y so that the electrical gap between the top cover plate 13 and the annular flange 142 can be blocked.

In an embodiment, the electrode terminal 14 may be a negative terminal or a positive terminal.

An embodiment of the present application also provides a secondary battery 10, which includes a housing 11, an electrode assembly 12 disposed in the housing 11, and a top cover assembly of the above-mentioned embodiment connected to the housing 11. The housing 11 is a cylindrical structure with an opening. The electrode assembly 12 is accommodated in the housing 11. The electrode assembly 12 is electrically connected to the electrode terminal 14. The top cover assembly is connected with the housing 11 and seals the opening of the housing 11. In an exemplary embodiment, the electrode assembly 12 includes a main body and a tab extending from the main body. The tab of the electrode assembly 12 is electrically connected to the electrode terminal 14.

In an embodiment, the secondary battery 10 further includes a current collector 17. The tab is connected to the electrode terminal 14 through the current collector 17. Optionally, the current collector 17 is welded to the electrode terminal 14.

The secondary battery 10 provided by embodiments of the present application includes a housing 11, an electrode assembly 12, and the top cover assembly of the above-mentioned embodiment. An insulating member 16 is provided between the top cover plate 13 and the electrode terminal 14 included in the top cover assembly. The insulating member 16 can lengthen the creepage distance between the top cover plate 13 and the electrode terminal 14. In this way, when the secondary battery 10 is subjected to high voltage, the possibility of breakdown between the top cover plate 13 and the electrode terminal 14 is reduced, and the safety in use of the secondary battery 10 is improved.

Although the present application has been described with reference to the preferred embodiments, various modification can be made to it and equivalents can be used to replace components therein without departing from the scope of the present application, especially as long as there is no structural conflict. Each technical feature mentioned in each embodiment can be combined in any way. The present application is not limited to the specific embodiments disclosed in the text, but includes all technical solutions falling within the scope of the claims.

What is claimed is:

1. A top cover assembly comprising:
a top cover plate comprising a lead-out hole and an inside surface forming the lead-out hole;
an electrode terminal comprising a cylindrical portion and an annular flange extending in a circumferential direction of the cylindrical portion, wherein the cylindrical portion penetrates through the lead-out hole, and the annular flange extends along a radial direction of the lead-out hole beyond the inside surface;
a sealing ring comprising a barrel portion and a ring portion extending in the circumferential direction of the barrel portion, wherein the barrel portion of the sealing ring surrounds the cylindrical portion, the inside surface is connected with the cylindrical portion through the barrel portion in a sealing manner, the ring portion comprises a first ring body and a second ring body successively distributed along the radial direction, the first ring body is connected with the barrel portion, the annular flange is connected with the top cover plate through the first ring body in a sealing manner, and the second ring body does not extend beyond the annular flange;
an insulating member comprising a connecting portion and an extension portion, wherein along the axial direction of the lead-out hole, a projection of the connecting portion overlaps with a projection of the second ring body, the connecting portion is connected with the second ring body in a sealing manner, a portion of the insulating member beyond the second ring body forms the extension portion, and along the radial direction, the extension portion extends beyond the annular flange,
wherein the top cover assembly further comprises a lower insulating plate, at least part of the lower insulating plate is disposed between the top cover plate and the annular flange of the electrode terminal along the axial direction and a projection of the lower insulating plate and a projection of the extension portion comprise an overlapped area along the axial direction,
wherein the second ring body and the lower insulating plate overlap along the axial direction, and form a sealing interface perpendicular to the axial direction and a sealing interface parallel to the axial direction at the overlap, and
the lower insulating plate is an integrated member,
wherein the sealing ring comprises an annular accommodation groove, the annular accommodation groove and the second ring body are arranged along the axial direction, and the connecting portion is at least partially disposed in the annular accommodation groove.

2. The top cover assembly according to claim 1, wherein the connecting portion is provided between the second ring body and the annular flange.

3. The top cover assembly according to claim 1, wherein the connecting portion and the extension portion are both a sheet-like structure.

4. The top cover assembly according to claim 1, wherein along the axial direction, a thickness of the connecting portion is D1, and wherein the thickness D1 of the connecting portion ranges from 0.1 mm to 0.7 mm.

5. The top cover assembly according to claim 1, wherein along the axial direction, a thickness of the connecting portion is D1, and a maximum thickness of the first ring body is D2, and wherein a value of D1/D2 is 0.05 to 0.73.

6. The top cover assembly according to claim 1, wherein the insulating member further comprises a cylinder body connected to the extension portion, the cylinder body extends along the axial direction, the cylinder body is disposed around the annular flange, and along the axial direction, an outer peripheral surface of the annular flange is at least partially covered by the cylinder body.

7. A secondary battery comprising:
a housing with an opening;
an electrode assembly contained in the housing;
the top cover assembly according to claim 1, wherein the top cover assembly seals the opening, and the electrode assembly is electrically connected to the electrode terminal.

* * * * *